March 12, 1940.   H. J. FRANK   2,192,884
AUTOMATIC FUEL INJECTION VALVE
Filed July 3, 1937
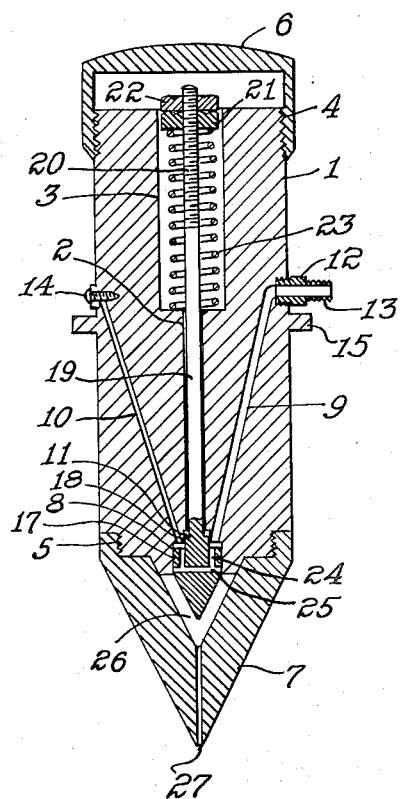
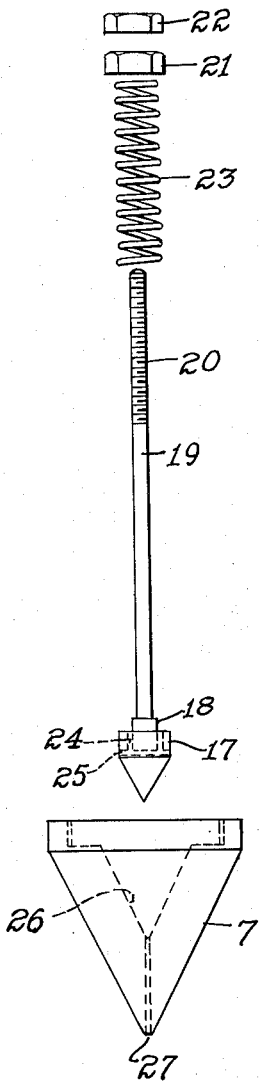
INVENTOR.
Horace J. Frank
BY William B. Jaspert
ATTORNEYS.

Patented Mar. 12, 1940

2,192,884

UNITED STATES PATENT OFFICE 2,192,884

AUTOMATIC FUEL INJECTION VALVE

Horace J. Frank, Pittsburgh, Pa.

Application July 3, 1937, Serial No. 151,902

1 Claim. (Cl. 299—107.6)

This invention relates to new and useful improvements in automatic injection valves for Diesel engines and the like, and it is among the objects of the invention to provide a valve which shall be positive in its operation to deliver metered quantities of fuel to the combustion chamber of the engine and to positively discontinue the fuel supply at the end of the delivery period of the fuel without any so-called dribbling from the orifice.

A further object of the invention is to provide a fuel valve of the above designated character which shall be capable of handling the minute quantities of fuel used at idling speeds of Diesel engines in their application to automobiles and the like.

Still another object of the invention is the provision of a fuel valve of plunger form adapted to be seated on the upper face of the valve by mechanical force and which is displaceable by the pressure of the inlet fuel delivered to the valve, whereby when the fuel supply is cut off, the valve will be subjected to a suction stroke, producing a small vacuum to thereby prevent dribbling of fuel from the valve orifice.

Still a further object of the invention is to generally eliminate the difficulties inherent in the so-called conventional type of needle valve, such as the elimination of wear of the valve seat, the trapping of grit in the valve seat, and the trapping of air in the valve chamber, which cause dribbling and mis-firing of the Diesel engine.

These and other objects of the invention will become more apparent from a consideration of the accompanying drawing constituting a part hereof in which like reference characters designate like parts and in which:

Fig. 1 is a vertical cross-sectional view of an automatic fuel valve embodying the principles of this invention; and Fig. 2 an exploded view of parts of the valve in elevation.

In the drawing, the reference numeral 1 designates the valve body or housing having a central bore 2, a counterbore 3, threaded ends 4 and 5, an end cap 6 and a nozzle 7. A counterbore or valve chamber 8 is provided at the lower end of the body 1 which communicates with a fuel passage 9 and an air vent 10. The valve chamber 8 terminates in a second counterbore 11, which is slightly larger than the central opening 2, but substantially smaller than the valve chamber 8. The fuel passage 9 extends to a fuel inlet 12 consisting of a threaded nipple which is screwed in the side of the valve body and which is provided with a threaded portion 13 for connection to a fuel supply line that leads to a fuel pump adapted to deliver the fuel in metered quantities, and which is actuated through connection with the crank shaft of the engine to be in timed relation therewith. The air vent 10 is provided with a closure 14 and the valve body is provided with a radial flange 15 by means of which it is mounted in place on the Diesel engine.

Disposed within the valve chamber 8 is a cylindrical valve 17 having a constricted portion 18 that fits in the small counterbore 11, and which is integrally or otherwise joined to a valve stem 19 that extends through the central bore 2 and the counterbore 3 to above the valve body 1, the upper portion being provided with a screw thread 20 for receiving a pair of screw nuts 21 and 22. A coil spring 23 is disposed in the counterbore 3, seating against the shoulder formed by the bottom of the counterbore 3 and having its upper end abutting the screw nut 21. By adjusting the nuts 21 and 22, any desired tension may be applied to the coil spring 23, whereby the valve body 17 is retracted to its closed position.

With reference to the main body of the valve 17, it is of cylindrical shape and is a lap fit in the valve chamber 8, constituting a plunger or piston in its movements therein. The valve is provided with drilled passages 24 which communicate with a horizontal passage 25 that in the upper position of valve 17 is sealed by the cylindrical wall of the valve chamber 8, but when the valve 17 is depressed, it is exposed to and communicates with a chamber 26, which is known as the fire cup delivery chamber, the bottom of which is provided with an orifice 27.

The operation of the above described fuel valve is briefly as follows: The valve body 17 normally rests against the end wall of the valve chamber 8, the constricted portion 18 forming a seal against fluid passage through the central bore into the upper portion of the valve body. When pressure of the fuel in the inlet 12 exceeds the tension of spring 23, it will cause downward movement of the valve 17, which exposes the passage 25 and permits the fuel to flow into the fire cup delivery chamber 26, thence through the orifice 27 into the combustion chamber of the Diesel engine. When the fuel supply is shut-off by the delivery pump after a metered quantity has been delivered, the spring 23 will snap valve 17 back into its closed position nead the end of valve chamber 8, which will bring passage 25 in sealing relation with the cylindrical wall of the valve chamber 8. This upward retraction of valve 17 produces a slight vacuum in the fire cup delivery chamber 26 so as to retract any fluid in the orifice 27 and prevent dribbling therefrom into the combustion chamber.

When the nozzle is installed in a Diesel engine, air will be present in the valve chamber 8, and this may be removed by opening the bleeder 14 to permit the air to escape. The port 14 is kept tightly sealed during the operation of the Diesel engine to prevent leakage.

As will be evident from the foregoing description of the invention, the conical or needle shape of the valve does not function in the sealing of the valve as that is brought about solely by the cylindrical valve chamber 8 and the complementary-shaped lap-fitted valve 17. Thus no grit or foreign matter can interfere with the closing of the valve to cause dribbling of the fuel. Neither is the cylindrical type valve subjected to the wear incident to the seating action of a needle valve, which because of pitting and erosion of the constantly abutting surfaces must be frequently renewed by grinding, resulting in leakage and mis-firing.

Because of the removability of the conical cup 7 and the end cap 6, the valve, spring and other elements are readily accessible for inspection and replacement.

Although one embodiment of the invention has been herein illustrated and described, it will be evident to those skilled in the art that various modifications may be made in the details of construction without departing from the principles herein set forth.

I claim:

A fuel valve for internal combustion engines comprising a valve body having fuel inlet and outlet passages, a cylindrical valve chamber communicating with said passages, a cylindrical valve forming a seal with the walls of said chamber, an air vent extending from said valve chamber to the side of the valve body, means for opening said vent, a conical-shaped screw cap constituting the lower end of the valve body and forming a fire cup delivery chamber beneath the valve chamber, the outlet passage extending through the tip of said screw cap, a valve stem extending upwardly through the valve body, an end cap at the upper end of the valve body forming a chamber for the end of a valve stem, coil springs disposed around the valve stem abutting at one end against the valve body and at its other end against adjustable end abutments formed at the top end of the valve stem, a flow passage through the valve body extending from the upper face of the valve and through the cylindrical wall of the valve, the lower end of the valve being shaped complementary to the bottom wall of the fire chamber, said valve being operative in response to pressure of said spring to normally close to seal the valve chamber against the flow of fuel from the inlet passage, and being further operative to displace the valve downwardly to cause the flow of fuel from the inlet passage through the valve passage into the fire chamber.

HORACE J. FRANK.